US012077729B2

(12) United States Patent
Piorkowski

(10) Patent No.: US 12,077,729 B2
(45) Date of Patent: Sep. 3, 2024

(54) UNIT DOSE DETERGENT PACK INCLUDING AN OPACIFIED LIQUID DETERGENT COMPOSITION FREE OF A MICROPLASTIC OPACIFIER

(71) Applicant: Henkel AG & Co. KGaA, Duesseldorf (DE)

(72) Inventor: Daniel Thomas Piorkowski, Fairfield, CT (US)

(73) Assignee: Henkel AG & Co. KGaA, Duesseldorf (DE)

(*) Notice: Subject to any disclaimer, the term of this patent is extended or adjusted under 35 U.S.C. 154(b) by 625 days.

(21) Appl. No.: 15/929,432

(22) Filed: May 1, 2020

(65) Prior Publication Data

US 2021/0340471 A1 Nov. 4, 2021

(51) Int. Cl.

| | |
|---|---|
| ***C11D 1/22*** | (2006.01) |
| ***C11D 1/32*** | (2006.01) |
| ***C11D 3/00*** | (2006.01) |
| ***C11D 3/04*** | (2006.01) |
| ***C11D 3/20*** | (2006.01) |

(Continued)

(52) U.S. Cl.

CPC .............. *C11D 17/043* (2013.01); *C11D 1/22* (2013.01); *C11D 3/0089* (2013.01); *C11D 3/044* (2013.01); *C11D 3/202* (2013.01); *C11D 3/30* (2013.01)

(58) Field of Classification Search

CPC .... C11D 1/22; C11D 1/32; C11D 3/00; C11D 3/044; C11D 3/20; C11D 3/30; C11D 17/042

See application file for complete search history.

(56) References Cited

U.S. PATENT DOCUMENTS

| | | | |
|---|---|---|---|
| 5,616,781 | A | 4/1997 | Sajic et al. |
| 6,024,943 | A | 2/2000 | Ness et al. |
| 6,056,949 | A | 5/2000 | Menzi et al. |

(Continued)

FOREIGN PATENT DOCUMENTS

| | | | |
|---|---|---|---|
| CN | 1231597 | A | 10/1999 |
| WO | 9532997 | A1 | 12/1995 |
| WO | 2010069957 | A1 | 6/2010 |

OTHER PUBLICATIONS

International Search Report and Written Opinion PCT/US2021/030465 Mail Date: Aug. 13, 2021; Completion Date: Aug. 13, 2021 9 Pages.

*Primary Examiner* — Brian P Mruk
(74) *Attorney, Agent, or Firm* — Bojuan Deng

(57) ABSTRACT

A unit dose detergent pack is disclosed. The unit dose detergent pack includes a pouch formed from a water-soluble film and an opacified liquid detergent composition releasably disposed within the pouch. The opacified liquid detergent composition includes a plurality of neutralizing agents including more than 50 mole percent of sodium hydroxide and a remainder alkanolamine based on a total of 100 mole percent of the sodium hydroxide and the alkanolamine together. The composition further includes a fatty acid and water. A weight ratio of the sodium hydroxide and the fatty acid is from about 0.3:1 to about 0.8 to 1. The opacified liquid detergent composition is free of a micro-plastic opacifier and has a turbidity of at least 250 NTUs measured utilizing a turbidity meter at about 24° C. Also disclosed is an opacified liquid detergent composition and a method of making the same.

19 Claims, 1 Drawing Sheet

(51) Int. Cl.
*C11D 3/30* (2006.01)
*C11D 17/04* (2006.01)

(56) References Cited

U.S. PATENT DOCUMENTS

| | | | | |
|---|---|---|---|---|
| 6,194,375 | B1 | 2/2001 | Ness et al. | |
| 6,458,754 | B1 | 10/2002 | Velazquez et al. | |
| 7,928,047 | B2 | 4/2011 | Cho et al. | |
| 8,282,743 | B2 | 10/2012 | Bonnechere et al. | |
| 8,426,353 | B2 | 4/2013 | Ouali et al. | |
| 8,716,213 | B2 * | 5/2014 | Caggioni | C11D 3/222<br>424/70.13 |
| 2005/0124738 | A1 | 6/2005 | Sivik et al. | |
| 2011/0224127 | A1 | 9/2011 | Blyth et al. | |
| 2017/0137745 | A1 * | 5/2017 | Tang | C11D 1/29 |
| 2017/0335237 | A1 | 11/2017 | Fossum et al. | |
| 2020/0002655 | A1 * | 1/2020 | Piorkowski | C11D 3/30 |

* cited by examiner

Reference 1
Sample 1
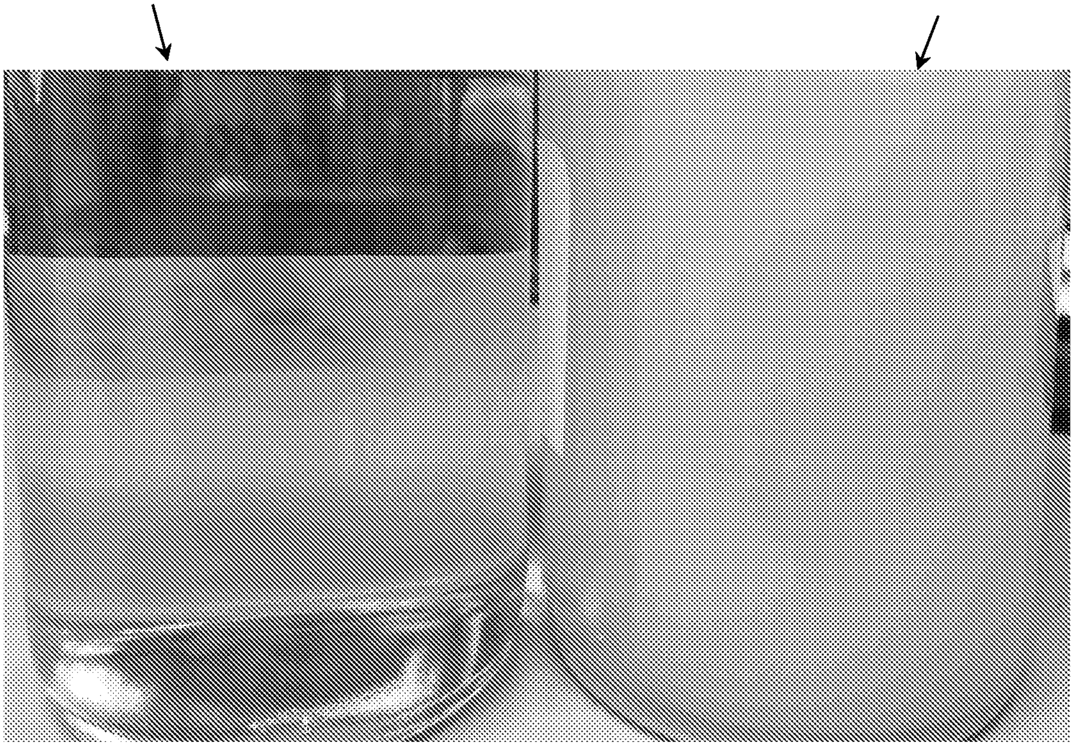

UNIT DOSE DETERGENT PACK INCLUDING AN OPACIFIED LIQUID DETERGENT COMPOSITION FREE OF A MICROPLASTIC OPACIFIER

FIELD OF THE INVENTION

The present disclosure relates generally to unit dose detergent packs and, more particularly, to a unit dose detergent pack including an opacified liquid detergent composition free of a microplastic opacifier.

BACKGROUND OF THE INVENTION

Liquid detergents including laundry and dishwasher liquid detergents often utilizer opacifiers to enhance the aesthetic and/or textural appearance of the liquid detergent. For example, many liquid detergents include ACUSOL' OP301, a microplastic opacifier available from The Dow Chemical Company to provide a "milky" or "lotionized" appearance to the liquid detergent. Although suitable for their intended use, microplastic opacifiers do not degrade well. Therefore, there remains a need for improvement.

SUMMARY OF THE INVENTION

The present disclosure provides a unit dose detergent pack comprising a pouch formed from a water-soluble film and an opacified liquid detergent composition releasably disposed within the pouch. The opacified liquid detergent composition includes: a plurality of neutralizing agents including more than 50 mole percent of sodium hydroxide and a remainder alkanolamine present based on a total of 100 mole percent of the plurality of neutralizing agents; a fatty acid; and water, wherein a weight ratio of the sodium hydroxide to the fatty acid is from about 0.3:1 to about 0.8:1 and the opacified liquid detergent composition is free of a microplastic opacifier and has a turbidity of at least 250 turbidity units (NTU) measured utilizing a turbidity meter at about 24° C.

An opacified liquid detergent composition is also provided. The opacified liquid detergent composition comprises: a plurality of neutralizing agents including more than 50 mole percent of sodium hydroxide and a remainder alkanolamine present based on a total of 100 mole percent of the plurality of neutralizing agents; a fatty acid; and water, wherein a weight ratio of the sodium hydroxide to the fatty acid is from about 0.3:1 to about 0.8:1 and the opacified liquid detergent composition is free of a microplastic opacifier and has a turbidity of at least 250 turbidity units (NTU) measured utilizing a turbidity meter at about 24° C.

Also disclosed is a method of making an opacified liquid detergent composition for a unit dose detergent pack. The method comprises the steps of: combining an alkanolamine and sodium hydroxide to form a combination with the sodium hydroxide present in an amount of more than 50 mole percent based on a total of 100 mole percent of the sodium hydroxide and the alkanolamine together; adding a surfactant to the combination to form a mixture; and then adding a fatty acid to the mixture to form the opacified liquid detergent composition that is free of a microplastic opacifier and has a turbidity of at least 250 turbidity units (NTU) measured utilizing a turbidity meter at about 24° C.

BRIEF DESCRIPTION OF THE DRAWING

The advantages of the present disclosure will be readily appreciated as the same becomes better understood by reference to the following detailed description when considered in connection with the accompanying drawing.

The FIGURE is a photograph of a first beaker including a sample of an opacified liquid detergent composition representative of the present disclosure (Sample 1) and a second beaker including a sample of a comparative liquid detergent composition (Reference 1).

DETAILED DESCRIPTION OF THE INVENTION

The following detailed description is merely exemplary in nature and is not intended to limit the unit dose detergent pack, the opacified liquid detergent composition, or the method of making the opacified liquid detergent composition for the unit dose pack of the present disclosure. Furthermore, there is no intention to be bound by any theory presented in the preceding background or the following detailed description.

Embodiments of the unit dose detergent pack and the opacified liquid detergent composition for the unit dose detergent pack are described in detail below. The unit dose detergent pack includes a pouch formed from a water-soluble film and an opacified liquid detergent composition releasably disposed within the pouch. Details of the opacified liquid detergent composition are described first and details of the pouch and the water-soluble film are described afterwards.

As used herein, the term "detergent" refers to a substance, preparation, agent, and/or the like including a mixture of ingredients having cleansing properties. One example is a laundry detergent, which is a detergent formulated for washing or cleaning laundry. Another example is dishwashing detergent, which is a detergent formulated for washing or cleaning dishware, drinking glasses, eating or cooking utensils, etc. The detergent may be specifically formulated for use in washing and cleaning processes performed with a washing machine or for use in washing or cleaning processes performed by hand.

Additionally, an opacified liquid detergent composition refers to a liquid detergent composition that is opaque. The liquid detergent composition may have any level of opaqueness, including a slightly opaque or translucent appearance in which some (but not all) light can be transmitted through the liquid such that objects behind the liquid cannot be seen clearly, an extremely opaque appearance in which no light can be transmitted through the liquid such that no objects behind the liquid can be seen clearly, and any level of opaqueness in-between. The opacified liquid detergent composition is not transparent, where light can be transmitted through the liquid such that objects behind the liquid can be clearly seen. In various embodiments, the opacified liquid detergent composition may be described herein as having a "cloudy" or "milky" or "lotionized" appearance.

The opacified liquid detergent composition of the present disclosure includes sodium hydroxide and an alkanolamine as neutralizing agents, and further includes a fatty acid. As demonstrated at least in Examples 1-3 of the Example section below, it was surprisingly and unexpectedly discovered that 1) the sodium hydroxide and the fatty acid present in a weight ratio of about 0.3:1 to about 0.8:1 of sodium hydroxide to fatty acid and 2) more than 50 mole percent of the sodium hydroxide based on a total of 100 mole percent of the plurality of neutralizing agents sufficiently opacifies the liquid detergent composition during a neutralization reaction while processing the liquid detergent composition. As a result of neutralization, the pH of the liquid detergent composition is from about 6 to about 8, or more particularly about 7. It was also unexpectedly found that opacification of the liquid detergent composition of the present disclosure remains stable over time. Therefore, a microplastic opacifier is not needed or required. Since the opacified liquid detergent composition is free of a microplastic opacifier, the opacified liquid detergent composition is advantageously biodegradable.

Neutralizing Agent(s)

The opacified liquid detergent composition includes a plurality of neutralizing agents. In an embodiment, the neutralizing agents include at least two neutralizing agents. For example, the neutralizing agents include an alkanolamine and a hydroxide. Non-limiting examples of suitable alkanolamines include monoethanolamine (MEA), diethanolamine, triethanolamine, isopropanolamine, and/or the like. In a particular embodiment, the alkanolamine is monoethanolamine (MEA). The alkanolamine is present in an amount of from about 0.1 to about 10% by weight based on a total weight of the opacified liquid detergent composition. In another embodiment, the alkanolamine is present in an amount of from about 0.3 to about 5% by weight based on a total weight of the opacified liquid detergent composition. In another embodiment, the alkanolamine is present in an amount of from about 0.5 to about 4% by weight based on a total weight of the opacified liquid detergent composition. In yet another embodiment, the alkanolamine is present in an amount of from about 0.6 to about 1.8% by weight based on a total weight of the opacified liquid detergent composition.

Non-limiting examples of suitable hydroxides include sodium hydroxide, potassium hydroxide, ammonium hydroxide, calcium hydroxide, and/or the like. In an embodiment, the opacified liquid detergent composition includes sodium hydroxide as one of the plurality of neutralizing agents. Sodium hydroxide is typically available as an aqueous solution including about 50% by weight of sodium hydroxide and about 50% by weight of water. It should be appreciated that the water content of the sodium hydroxide solution is taken into account when determining the total amount of water in the opacified liquid detergent composition described below. In an embodiment, the sodium hydroxide solution is present in an amount of from about 4 to about 10% by weight based on a total weight of the opacified liquid detergent composition. In this embodiment, the amount of active sodium hydroxide present ranges from about 2 to about 5% by weight based on a total weight of the opacified liquid detergent composition. In another embodiment, the sodium hydroxide solution is present in an amount of from about 4 to about 8% by weight based on a total weight of the opacified liquid detergent composition. In this embodiment, the amount of active sodium hydroxide present ranges from about 2 to about 4% by weight based on a total weight of the opacified liquid detergent composition. In yet another embodiment, the sodium hydroxide solution is present in an amount of from about 6 to about 8% by weight based on a total weight of the opacified liquid detergent composition. In this embodiment, the amount of active sodium hydroxide present ranges from about 3 to about 4% by weight based on a total weight of the opacified liquid detergent composition.

In the embodiments described herein, the sodium hydroxide is mostly responsible for neutralization of the liquid detergent composition during processing. For example, the plurality of neutralizing agents includes more than 50 mole percent of the sodium hydroxide and a remainder alkanolamine based on a total of 100 mole percent of the plurality of neutralizing agents. In another example, the plurality of neutralizing agents includes from about 55 to about 90 mole percent of the sodium hydroxide and a remainder alkanolamine based on a total of 100 mole percent of the plurality of neutralizing agents. In another example, the plurality of neutralizing agents includes from about 65 to about 90 mole percent of the sodium hydroxide and a remainder alkanolamine based on a total of 100 mole percent of the plurality of neutralizing agents. In yet another example, the plurality of neutralizing agents includes from about 75 to about 90 mole percent of the sodium hydroxide and a remainder alkanolamine based on a total of 100 mole percent of the plurality of neutralizing agents.

Fatty Acid

The opacified liquid detergent composition furthers include a fatty acid. Non-limiting examples of suitable fatty acids include coconut fatty acid, carboxylic acid, lauric acid, myristic acid, palmitic acid, stearic acid, topped palm kernel fatty acid, and combinations thereof. In an embodiment, the fatty acid is obtained from palm kernel oil and has a backbone including from 12 to 20 carbon atoms. In a particular embodiment, the fatty acid is a coconut fatty acid. The fatty acid is present in an amount of from about 2 to about 10% by weight based on a total weight of the opacified liquid detergent composition. In another embodiment, the fatty acid is present in an amount of from about 4 to about 10% by weight based on a total weight of the opacified liquid detergent composition. In various embodiments, the fatty acid is present in an amount of about 4% by weight, about 8% by weight, or about 10% by weight based on a total weight of the opacified liquid detergent composition.

Surfactants

The opacified liquid detergent composition further includes at least one surfactant. The surfactant(s) is used in the composition to facilitate foaming and stain removal, as well as to minimize redeposition of soils onto a fabric. In an embodiment, the surfactant(s) includes anionic surfactants and/or nonionic surfactants. In a particular embodiment, the opacified liquid detergent composition includes both an anionic surfactant and a nonionic surfactant. In an embodiment, the amount of surfactant(s) present ranges from about 20 to about 50% by weight based on a total weight of the opacified liquid detergent composition. In another embodiment, the amount of surfactant(s) present ranges from about 20 to about 45% by weight based on a total weight of the opacified liquid detergent composition. In still another embodiment, the amount of surfactant(s) present ranges from about 20 to about 30% by weight based on a total weight of the opacified liquid detergent composition.

The opacified liquid detergent composition may include a linear alkylbenzene sulfonate (LAS) as an anionic surfactant. The linear alkylbenzene sulfonate is a water-soluble salt of a linear alkyl benzene sulfonate having from 8 to 22 carbon atoms of the linear alkyl group. The salt may be an alkali metal salt or an ammonium, alkylammonium, alkanolammonium salt. In an example, the linear alkylbenzene sulfonate includes an alkali metal salt of $C_{10}$-$C_{16}$ alkyl benzene sulfonic acids, such as $C_{11}$-$C_{14}$ alkyl benzene sulfonic acids. Suitable linear alkylbenzene sulfonates include sodium and potassium linear, alkylbenzene sulfonates with the average number of carbon atoms in the alkyl group being from 11 to 14. In one example, sodium $C_{11}$-$C_{14}$ linear alkylbenzene sulfonate is a suitable anionic surfactant for the structured liquid detergent composition. The linear alkylbenzene sulfonate is present in an amount of from about 10 to about 40% by weight based on a total weight of the composition. In another embodiment, the linear alkylbenzene sulfonate is present in an amount of from about 20 to about 30% by weight based on a total weight of the composition. In yet another embodiment, the linear alkylbenzene sulfonate is present in an amount of from about 20 to about 25% by weight based on a total weight of the composition. In a particular embodiment, the linear alkylbenzene sulfonate is present in an amount of about 22% by weight based on a total weight of the composition.

It should be appreciated that the opacified liquid detergent composition may include one or more other anionic surfactants in addition to the linear alkylbenzene sulfonate.

The nonionic surfactant may be chosen from a wide range of nonionic surfactants. In an embodiment, the nonionic surfactant is chosen from, but not limited to, alkoxylated alcohols, polyoxyalkylene alkyl ethers (such as those under the tradename PLURONIC® available from BASF Corp. (Ludwigshafen, Germany)), polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, or a combination thereof. In another embodiment, the non-ionic surfactant is an alcohol ethoxylate (AE).

The alcohol ethoxylate may be primary and secondary alcohol ethoxylates, such as $C_8$-$C_{20}$ aliphatic alcohols ethoxylated with an average of from 1 to 20 moles of ethylene oxide per mole of alcohol. In another embodiment, the alcohol ethoxylate is a $C_{10}$-$C_{15}$ primary and secondary aliphatic alcohol ethoxylated with an average of from 1 to 10 moles, or from 3 to 8 moles of ethylene oxide per mole of alcohol.

Examples of alcohol ethoxylates include, but are not limited to, the condensation products of aliphatic $C_8$-$C_{20}$, preferably $C_8$-$C_{16}$, primary or secondary, linear or branched chain alcohols with ethylene oxide. In some embodiments, the alcohol ethoxylates contain 1 to 20, or 3 to 8 ethylene oxide groups, and may be end-capped by a hydroxylated alkyl group.

In one embodiment, the alcohol ethoxylate has the Formula (1):

$$R_2—(—O—C_2H_4—)_m—OH \quad (1);$$

wherein $R_2$ is a hydrocarbyl group having 8 to 16 carbon atoms and M is a number from 1 to 20. In another embodiment, $R_2$ is a hydrocarbyl group having 8 to 14 carbon atoms, 8 to 12 carbon atoms, or 8 to 10 carbon atoms, and M is a number from 3 to 8.

The hydrocarbyl group may be linear or branched, and saturated or unsaturated. In some embodiments, $R_2$ is a linear or branched $C_8$-$C_{16}$ alkyl or a linear group or branched $C_8$-$C_{16}$ alkenyl group. In an embodiment, $R_2$ is a linear or branched $C_8$-$C_{16}$ alkyl, $C_8$-$C_{14}$ alkyl, or $C_8$-$C_{10}$ alkyl group. The alcohol may be derived from natural or synthetic feedstock. In one embodiment, the alcohol feedstock is coconut, including predominantly $C_{12}$-$C_{14}$ alcohol, and oxo $C_{12}$-$C_{15}$ alcohols.

Non-limiting examples of the alcohol ethoxylate include TOMADOL® available from Evonik Corp. (Essen, Germany) and NEODOL® available from Shell Global (The Hague, The Netherlands).

In an embodiment, the nonionic surfactant(s) is present in an amount of from about 10 to about 40% by weight based on a total weight of the composition. In another embodiment, the nonionic surfactant(s) is present in an amount of from about 20 to about 30% by weight based on a total weight of the composition. In yet another embodiment, the nonionic surfactant(s) is present in an amount of from about 20 to about 25% by weight based on a total weight of the composition. In a particular embodiment, the nonionic surfactant(s) is present in an amount of about 22% by weight based on a total weight of the composition.

It should be appreciated that, in certain embodiments, the plurality of surfactants could also include additional surfactants, such as but not limited to, cationic surfactants, amphoteric (zwitterionic) surfactants, etc. In other embodiments, the structured liquid detergent composition is free of additional surfactants including cationic surfactants, amphoteric (zwitterionic) surfactants, etc.

Water

The opacified liquid detergent composition further includes water, such as deionized (or DI) water. Notably, the water content includes the water from the sodium hydroxide solution, the sodium sulfite solution, or other solutions when used, as well as water that is added separately. In an embodiment, the total amount of water present in the composition is less than 30% by weight based on a total weight of the opacified liquid detergent composition. The opacified liquid detergent composition having less than 30% by weight of water is said to have a low water content, and is suitable for use in unit dose detergent packs. In another embodiment, water is present in an amount of from about 10 to about 30% by weight based on a total weight of the liquid detergent composition. In another embodiment, water is present in an amount of from about 10 to about 20% by weight based on a total weight of the liquid detergent composition. In one particular embodiment, the liquid detergent composition includes about 13.4% by weight of water.

Non-Aqueous Solvent

The opacified liquid detergent composition may further include a non-aqueous solvent. The non-aqueous solvent is used to help solubilize the components of the liquid detergent composition, as well as to maintain homogeneity of the composition at various storage conditions. Additionally, the non-aqueous solvent serves as a water-binding agent to reduce water activity of the composition. This reduces water transfer of the composition to the surrounding water-soluble container of the unit dose detergent pack to avoid swelling and/or leakage through the water-soluble film material of the container.

In an embodiment, the non-aqueous solvent includes monovalent or polyvalent alcohols and glycol ethers. Non-limiting examples of the non-aqueous solvent include ethanol, propylene glycol, butylene glycol, pentylene glycol, hexylene glycol, heptylene glycol, octylene glycol, diethylene glycol, triethylene glycol, 2-methyl-1,3-propanediol, glycerol, 1,3-propanediol, triacetin, ethyl acetate, benzyl alcohol, polyethylene glycol having a molecular weight of from 200 to 3000 g/mol, and combinations thereof. In one particular embodiment, the liquid detergent composition includes glycerol and propylene glycol as non-aqueous solvents.

In an embodiment, the non-aqueous solvent is present in the composition in an amount of from about 10 to about 40% by weight based on a total weight of the opacified liquid detergent composition. In another embodiment, the non-aqueous solvent is present in the composition in an amount of from about 15 to about 30% by weight based on a total weight of the opacified liquid detergent composition. In yet another embodiment, the non-aqueous solvent is present in the composition in an amount of from about 15 to about 25% by weight based on a total weight of the opacified liquid detergent composition.

Additives

The opacified liquid detergent composition may further include at least one additive. In an embodiment, the opacified liquid detergent composition includes a suspension polymer, such as an alkoxylated polyethyleneimine. The alkoxylated polyethyleneimine may have a polyethyleneimine backbone having a weight average molecular weight from about 300 to about 10,000. The polyethyleneimine backbone may be modified by either (1) one or two alkoxylation modifications per nitrogen atom depending, at least in part, on whether the modification occurs at an internal nitrogen atom or at a terminal nitrogen atom, in the polyethyleneimine backbone, the alkoxylation modification including the replacement of a hydrogen atom by a polyalkoxylene chain having an average of about 1 to about 40 alkoxy moieties per modification with the terminal alkoxy moiety of the alkoxylation modification capped with hydrogen, a $C_1$-$C_4$ alkyl, or combinations thereof, (2) a substitution of one $C_1$-$C_4$ alkyl moiety and one or two alkoxylation modifications per nitrogen atom depending, at least in part, on whether the substitution occurs at an internal nitrogen atom or at an terminal nitrogen atom, in the polyethyleneimine backbone, the alkoxylation modification including the replacement of a hydrogen atom by a polyalkoxylene chain having an average of about 1 to about 40 alkoxy moieties per modification with the terminal alkoxy moiety capped with hydrogen, a $C_1$-$C_4$ alkyl, or combinations thereof, or (3) a combination of (1) and (2).

The alkoxylation modification of the polyethyleneimine backbone includes the replacement of a hydrogen atom by a polyalkoxylene chain having an average of about 1 to about 40 alkoxy moieties, typically from about 5 to about 20 alkoxy moieties. The alkoxy moieties are selected from ethoxy (EO), 1,2-propoxy (1,2-PO), 1,3-propoxy (1,3-PO), butoxy (BO), and combinations thereof. In some embodiments, the polyalkoxylene chain is selected from ethoxy moieties and ethoxy/propoxy block moieties. The polyalkoxylene chain may be ethoxy moieties in an average degree of from about 5 to about 15 or the polyalkoxylene chain may be ethoxy/propoxy block moieties having an average degree of ethoxylation from about 5 to about 15 and an average degree of propoxylation from about 1 to about 16.

In an embodiment, the suspension polymer is an ethoxylated polyethyleneimine present in an amount of from about 0.1 to about 10% by weight based on a total weight of the opacified liquid detergent composition. In another embodiment, the suspension polymer is an ethoxylated polyethyleneimine present in an amount of from about 4 to about 8% by weight based on a total weight of the opacified liquid detergent composition. In yet another embodiment, the suspension polymer is an ethoxylated polyethyleneimine present in an amount of about 6% by weight based on a total weight of the opacified liquid detergent composition.

The opacified liquid detergent composition may further include, as an additive, a bittering agent. The bittering agent imparts a bitter taste to the composition thereby hindering accidental ingestion of the composition by children, animals, etc. Non-limiting examples of suitable bittering agents include denatonium benzoate (such as BITREX® available from Bitrex (Edinburgh, Scotland), aloin, and/or the like. In an embodiment, the opacified liquid detergent composition includes from about 0.01 to about 0.1% by weight of the bittering agent based on a total weight of the opacified liquid detergent composition. In another embodiment, the opacified liquid detergent composition includes about 0.05% by weight of the bittering agent based on a total weight of the opacified liquid detergent composition.

As another additive, the composition may include an optical brightener. Suitable optical brighteners include stilbenes such as TINOPAL® AMS available from BASF Corp., distyrylbiphenyl derivatives such as TINOPAL® CBS-X also available from BASF Corp., stilbene/naphthotriazole blends (e.g., TINOPAL® RA-16), oxazole derivatives, and/or coumarin brighteners. In an embodiment, the opacified liquid detergent composition includes from about 0.01 to about 1% by weight of the optical brightener based on a total weight of the opacified liquid detergent composition. In another embodiment, the opacified liquid detergent composition includes about 0.2% by weight of the optical brightener based on a total weight of the opacified liquid detergent composition.

The composition may further include sodium sulfite as an oxygen scavenger. In particular, the sodium sulfite reacts with oxygen to form sodium sulphate to lower the oxygen content, thereby reducing or even preventing formation of rust on various interior various components of the washing machine. Sodium sulfite is typically provided in the form of an aqueous solution, including about 85% by weight of the sodium sulfite and about 15% by weight of water. It should be appreciated that the water content of the solution is taken into account when determining the total amount of water in the opacified liquid detergent composition. In an embodiment, the sodium sulfite solution is present in an amount of from about 0.1 to about 5% by weight based on a total weight of the opacified liquid detergent composition. In this embodiment, about 0.85 to about 4.25% by weight of active sodium sulfite is present in the opacified liquid detergent composition.

The composition may further include, as an additive, one or more enzymes. The enzymes may be chosen amylolytic, proteolytic, cellulolytic, and/or lipolytic-type enzymes. Other suitable enzymes include, but are not limited to, proteases, amylases, lipases, and cellulases such as ALCALASE® (bacterial protease), EVERLASE® (protein-engineered variant of SAVINASE®), ESPERASE® (bacterial protease), LIPOLASE® (fungal lipase), LIPOLASE ULTRA® (Protein-engineered variant of LIPOLASE®), LIPOPRIME® (protein-engineered variant of LIPOLASE®), TERMAMYL® (bacterial amylase), BAN (Bacterial Amylase Novo), CELLUZYME® (fungal enzyme), and CAREZYME® (monocomponent cellulase), all available from Novo Nordisk Industries A/S (Bagsvaerd, Denmark). Blends of two or more enzymes may also be used, such as a protease/lipase blend, a protease/amylase blend, a protease/amylase/lipase blend, etc.

As another additive, the composition may include an optical brightener. Suitable optical brighteners include stilbenes such as TINOPAL® AMS available from BASF Corp., distyrylbiphenyl derivatives such as TINOPAL® CBS-X also available from BASF Corp., stilbene/naphthotriazole blends (e.g., TINOPAL® RA-16), oxazole derivatives, and/or coumarin brighteners.

An antifoam agent may also be used to reduce or hinder the formation of foam. Suitable antifoam agents include, but are not limited to, a polyalkoxylated alkanolamide, amide, amine oxide, betaine, sultaine, $C_8$-$C_{18}$ fatty alcohols, and those disclosed in U.S. Pat. No. 5,616,781, the relevant portion(s) of which is incorporated hereby by reference. An auxiliary foam stabilizing surfactant, such as a fatty acid amide surfactant, may also be included in the composition, such as $C_8$-$C_{20}$ alkanol amides, monoethanolamides, diethanolamides, or isopropanolamides. Other suitable antifoam agents include those derived from phenylpropylmethyl substitute polysiloxanes.

The composition may further include a dye transfer inhibitor to help prevent colorants (e.g., a dye) from coming off a fabric and being deposited onto another fabric during a washing cycle. The dye transfer inhibitors are polymers adapted to entrap dyes in the washing liquor. Non-limiting examples of dye transfer inhibitors include homopolymers and copolymers of vinylpyrrolidone and vinylimidazole.

As another additive, the composition may include a soil release agent. Suitable soil release agents are polymers such as, but not limited to, a nonionic polyester of polypropylene terephthalate such as TEXCARE® SRN available from Clariant, a polyethylene glycol polyester such as REPEL-O-TEX SRP available from Solvay, end-capped and non-end-capped sulfonated and unsulfonated PET/POET polymers of the type as disclosed in International Patent Publication Nos. WO2010/069957 and WO1995/032997, the relevant portions of which are incorporated herein by reference, polyethylene glycol/polyvinyl alcohol graft copolymers such as SOKALAN HP 22 available from BASF Corp., and/or anionic hydrophobic polysaccharides.

Colorants and fragrances may also be used, as additives, in the composition. Colorants suitable for use in the structured liquid detergent composition include dyes of a variety of different colors, such as blue, yellow, green, orange, green, purple, etc. Suitable dyes include, but are not limited to, chromophore types such as azo, anthraquinone, triarylmethane, methine quinophthalone, azine, oxazine, and thiazine which may be of any desired color, hue or shade. Suitable dyes may be obtained from Clariant, Ciba Speciality Chemicals, Dystar, Avecia, Bayer, or any other suitable manufacturer.

Fragrances may include any fragrant substance or mixture of substances including natural fragrances (such as those extracted from flowers, herbs, leaves, roots, barks, woods, blossoms, plants, etc.), artificial fragrances (such as natural oils or oil constituents), encapsulated, and synthetically produced fragrances. Non-limiting examples of fragrances that may be used in the composition are set forth in U.S. Pat. Nos. 6,024,943; 6,056,949; 6,194,375; 6,458,754; 8,716,213; and 8,426,353 and in United States Patent Publication Nos. 2011/0224127 and 2017/0335237, the relevant portions of which are incorporated herein by reference.

The composition may further include, as another additive, an antimicrobial agent. Suitable antimicrobial agents include an antimicrobial, a germicide, or a fungicide. In an embodiment, the antimicrobial agent may be triclosan (5-chloro-2-(2,4-dichloro-phenoxy) phenol)), and/or the like.

It should be understood that other additives may also be present. For example, the composition may further include a chelator, such as a tetrasodium iminodisuccinate and/or the like.

Opacification

As demonstrated at least by Examples 1-3 below, the liquid detergent composition of the present disclosure has a turbidity of at least 250 Nephelometric Turbidity Units (NTUs) measured using a turbidity meter (a 2100N Laboratory Turbidimeter available from Hach Company (Loveland, Colo.) at 24° C. At this turbidity, the liquid detergent composition is considered to be opacified, i.e., having a cloudy, milky, or lotionized appearance. In another embodiment, the liquid detergent composition of the present disclosure has a turbidity of at least 1000 NTUs measured using the turbidity meter at 24° C. In a particular embodiment, the liquid detergent composition has a turbidity of from about 2000 to about 3000 NTUs measured using the turbidity meter at 24° C.

Unit Dose Detergent Pack

The unit dose detergent pack includes the pouch formed or made from the water-soluble film and, as mentioned above, the opacified liquid detergent composition is releasably disposed within the pouch. Details of various embodiments of the opacified liquid detergent composition are described above. The pouch defines at least one compartment and the opacified liquid detergent composition is releasably disposed or encapsulated within the at least one compartment. The pouch may have a single compartment and the opacified liquid detergent composition is releasably disposed within the single compartment. Alternatively, the pouch may have two or more compartments and the opacified liquid detergent composition is releasably disposed within at least one of the two or more compartments. The other compartment(s) may include colorants or other components.

The pouch may be formed from a single continuous water-soluble film. In another embodiment, the pouch is formed from a plurality of water-soluble films joined and sealed to one another, such as along their edges such that the inner surfaces of the water-soluble films collectively define the compartment. In an embodiment, the film is water-soluble such that the film completely dissolves when exposed to water, such as in a washing machine for washing laundry. When the film dissolves, the pouch ruptures and the contents of the pouch (e.g., the liquid detergent composition) are released. As used herein, the term "water-soluble" means that least 2 grams of the solute (e.g., the film) dissolves in 5 liters of solvent (e.g., water) for a solubility of at least 0.4 grams per liter (g/l) at a temperature of 25° C. unless otherwise specified.

The film is desirably strong, flexible, shock resistant, and non-tacky during storage at both high and low temperatures and high and low humidities. Non-limiting examples of suitable materials for the water-soluble film include polyvinyl alcohol, polyvinyl acetate, film-forming cellulosic polymers, polyacrylic acid, polyacrylamide, polyanhydride, polysaccharide, and combinations thereof. In a particular embodiment, the water-soluble film is polyvinyl alcohol.

Method of Making the Liquid Detergent Composition

Also disclosed is a method of making an opacified liquid detergent composition for a unit dose detergent pack. The method includes the step of introducing water into a vessel such as a beaker. The method further includes adding the neutralizing agents, particularly the alkanolamine and the sodium hydroxide to the water in the vessel. The alkanolamine and the sodium hydroxide may be introduced sequentially in any order or may be introduced at the same time.

In the vessel, the method includes combining the alkanolamine and the sodium hydroxide to form a combination with the sodium hydroxide present in an amount of more than 50 mole percent based on a total of 100 mole percent of the sodium hydroxide and the alkanolamine together. The combining step may be accomplished by mixing (e.g., agitating) the sodium hydroxide and the alkanolamine (and the water) inside the vessel utilizing, for example, a mixing blade or rod. Mixing is typically performed at room temperature, with mixing parameters (such as mixing speed) dependent, at least in part, on the size of the batch of liquid detergent being formed.

The method further includes the steps of adding a surfactant to the combination (of the sodium hydroxide and the alkanolamine) to form a mixture, and then adding a fatty acid to the mixture to form the opacified liquid detergent composition that is free of a microplastic opacifier and has a turbidity of at least 250 NTUs measured utilizing a turbidity meter at 24° C. In an embodiment, a non-aqueous solvent, additional water if needed, and additives are added after the addition of the fatty acid. As mentioned above, it was surprisingly discovered that when the neutralizing agents (sodium hydroxide and alkanolamine) are added initially, followed by the surfactant and then the fatty acid, opacification of the liquid detergent composition occurs and remains stable over time.

The following examples are meant to illustrate the invention and are not to be viewed in any way as limiting the scope of the present claims.

EXAMPLES

Example 1

Two samples of a liquid detergent composition were prepared. One of the Samples (Sample 1) was prepared as an opacified liquid detergent composition representative of the present disclosure. The other one of the samples (Reference 1) was prepared as a reference composition without an opacifier. The compositions of Sample 1 and Reference 1 are set forth in Table 1 below.

TABLE 1

| Ingredient | Sample 1 (% by weight) | Reference 1 (% by weight) |
|---|---|---|
| Glycerol | 13.53 | 12.35 |
| Sodium Sulfite, 15% solution | 1.33 | 1.33 |
| Chelator | 0.90 | 0 |
| Propylene Glycol | 8.21 | 8.21 |
| Alcohol Ethoxylate, 25-7 | 22.19 | 22.19 |
| Optical Brightener | 0.20 | 0.20 |
| Monoethanolamine | 0.60 | 6.60 |
| Sodium Hydroxide (NaOH) | 7.85 | 0 |
| Linear Alkylbenzene Sulfonate (LAS) | 22.20 | 22.20 |
| Coconut Fatty Acid | 10.00 | 10.00 |
| Performance Polymer | 6.00 | 6.00 |
| Bittering Agent | 0.05 | 0.05 |
| DI Water | 6.95 | 10.87 |
| Total Water | 13.37 | 13.38 |

*Alcohol Ethoxylate, 25-7 refers to an alcohol ethoxylate having 12 to 15 carbon atoms and 7 moles of ethoxylation Both of the liquid detergent compositions Sample 1 and Reference 1 were batched and then disposed into respective beakers. The Figure shows the liquid detergent composition representative of the present disclosure (Sample 1) disposed in the beaker on the right side, and the comparative liquid detergent composition (Reference 1) disposed in the beaker on the left side. As shown in the Figure, Sample 1 (on the right side) had a cloudy, milky, and opacified appearance while Comparative 1 (on the left side) had a transparent appearance (where the slight cloudiness shown is caused from the environment behind the beaker). Additionally, after aging for two weeks at 24° C. (75° F.) and 41° C. (105° F.) and for an additional one week at 52° C. (125° F.), the results showed that Sample 1 maintained opacification, demonstrating the stability of the opacified composition.

Example 2

Nine samples of a liquid detergent composition were prepared. The liquid detergent composition Reference 1 provided in Table 1 above was used as the reference composition in this Example 2. Three of the samples (Samples 2-4) were prepared including 90 mole percent of sodium hydroxide based on a total of 100 mole percent of the combination of sodium hydroxide and monoethanolamine, and including 10, 8, and 4% by weight of coconut fatty acid. The compositions of Samples 2-4 are set forth in Table 2 below.

TABLE 2

| Ingredient | Sample 2 (% by weight) | Sample 3 (% by weight) | Sample 4 (% by weight) |
|---|---|---|---|
| Glycerol | 14.43 | 16.67 | 21.15 |
| Sodium Sulfite, 15% solution | 1.33 | 1.33 | 1.33 |
| Propylene Glycol | 8.21 | 8.21 | 8.21 |
| Alcohol Ethoxylate, 25-7 | 22.19 | 22.19 | 22.19 |
| Optical Brightener | 0.20 | 0.20 | 0.20 |
| Monoethanolamine | 0.60 | 0.60 | 0.60 |
| Sodium Hydroxide (NaOH), 50% solution | 7.85 | 7.37 | 6.41 |
| Linear Alkylbenzene Sulfonate (LAS) | 22.20 | 22.20 | 22.20 |
| Coconut Fatty Acid | 10.0 | 8.00 | 6.00 |
| Performance Polymer | 6.00 | 6.00 | 6.00 |
| Bittering Agent | 0.05 | 0.05 | 0.05 |
| DI Water | 6.95 | 7.19 | 7.67 |
| Total Water | 13.37 | 13.37 | 13.37 |

*Alcohol Ethoxylate, 25-7 refers to an alcohol ethoxylate having 12 to 15 carbon atoms and 7 moles of ethoxylation The next three samples (Samples 4-6) were prepared including 75 mole percent of sodium hydroxide based on a total of 100 mole percent of the combination of sodium hydroxide and monoethanolamine, and including 10, 8, and 4% by weight of coconut fatty acid. The compositions of Samples 5-7 are set forth in Table 3 below.

TABLE 3

| Ingredient | Sample 5 (% by weight) | Sample 6 (% by weight) | Sample 7 (% by weight) |
|---|---|---|---|
| Glycerol | 14.07 | 16.44 | 21.18 |
| Sodium Sulfite, 15% solution | 1.33 | 1.33 | 1.33 |
| Propylene Glycol | 8.21 | 8.21 | 8.21 |
| Alcohol Ethoxylate, 25-7 | 22.19 | 22.19 | 22.19 |
| Optical Brightener | 0.20 | 0.20 | 0.20 |
| Monoethanolamine | 1.65 | 1.28 | 0.54 |
| Sodium Hydroxide (NaOH), 50% solution | 6.48 | 6.48 | 6.48 |
| Linear Alkylbenzene Sulfonate (LAS) | 22.20 | 22.20 | 22.20 |
| Coconut Fatty Acid | 10.0 | 8.00 | 6.00 |
| Performance Polymer | 6.00 | 6.00 | 6.00 |
| Bittering Agent | 0.05 | 0.05 | 0.05 |
| DI Water | 7.63 | 7.63 | 7.63 |
| Total Water | 13.37 | 13.37 | 13.37 |

*Alcohol Ethoxylate, 25-7 refers to an alcohol ethoxylate having 12 to 15 carbon atoms and 7 moles of ethoxylation The remaining three samples (Samples 7-9) were prepared including 50 mole percent of sodium hydroxide based on a total of 100 mole percent of the combination of sodium hydroxide and monoethanolamine, and including 10, 8, and 4% by weight of coconut fatty acid. The compositions of Samples 8-10 are set forth in Table 4 below.

TABLE 4

| Ingredient | Sample 8 (% by weight) | Sample 9 (% by weight) | Sample 10 (% by weight) |
|---|---|---|---|
| Glycerol | 13.50 | 18.87 | 20.61 |
| Sodium Sulfite, 15% solution | 1.33 | 1.33 | 1.33 |

TABLE 4-continued

| Ingredient | Sample 8 (% by weight) | Sample 9 (% by weight) | Sample 10 (% by weight) |
|---|---|---|---|
| Propylene Glycol | 8.21 | 8.21 | 8.21 |
| Alcohol Ethoxylate, 25-7 | 22.19 | 22.19 | 22.19 |
| Optical Brightener | 0.20 | 0.20 | 0.20 |
| Monoethanolamine | 3.30 | 2.93 | 2.19 |
| Sodium Hydroxide (NaOH), 50% solution | 4.32 | 4.32 | 4.32 |
| Linear Alkylbenzene Sulfonate (LAS) | 22.20 | 22.20 | 22.20 |
| Coconut Fatty Acid | 10.0 | 8.00 | 6.00 |
| Performance Polymer | 6.00 | 6.00 | 6.00 |
| Bittering Agent | 0.05 | 0.05 | 0.05 |
| Zeolite Water | 8.71 | 8.71 | 8.71 |
| Total Water | 13.37 | 13.37 | 13.37 |

*Alcohol Ethoxylate, 25-7 refers to an alcohol ethoxylate having 12 to 15 carbon atoms and 7 moles of ethoxylation Each of the liquid detergent compositions Samples 2-10 and Reference 1 were disposed into respective beakers and visually inspected after batching to determine the presence of opacification. The results are summarized in Table 5 below.

TABLE 5

| Sample | Opacified Effect? | Mole Percent NaOH | Coconut Fatty Acid (wt %) |
|---|---|---|---|
| Reference 1 | No | 0 | 10 |
| Sample 2 | Yes | 90 | 10 |
| Sample 3 | Yes | 90 | 8 |
| Sample 4 | Yes | 90 | 4 |
| Sample 5 | Yes | 75 | 10 |
| Sample 6 | Yes | 75 | 8 |
| Sample 7 | Yes | 75 | 4 |
| Sample 8 | No | 50 | 10 |
| Sample 9 | No | 50 | 8 |
| Sample 10 | No | 50 | 4 |

The results summarized in Table 5 above show that a minimum of 75 mole percent of sodium hydroxide (based on a total of 100 mole percent of sodium hydroxide and monoethanolamine) produced an opacified liquid detergent composition (Samples 2-7). The liquid detergent compositions including 50 mole percent sodium hydroxide (based on a total of 100 mole percent of sodium hydroxide and monoethanolamine) did not have sufficient opacification (Samples 8-10), and were comparable to the reference composition (Reference 1) including no sodium hydroxide. The results also show that the amount (wt %) of coconut fatty acid present in the liquid detergent composition had no effect on opacification when less than 75 mole percent of sodium hydroxide is used.

Example 3

The turbidity (i.e., a measure of cloudiness) of each of the Samples 1-7 and Reference 1 was measured in Nephelometric Turbidity Units (NTU) at 24° C. (75° F.) using a 2100N Laboratory Turbidimeter available from Hach Company (Loveland, Colo.). The turbidimeter operates by comparing how light is scattered in a sample against the amount of light scattered in a reference solution. A turbidity value under 10 NTU is considered transparent, and a turbidity value above 10 NTU is considered cloudy. Liquid detergent compositions having a turbidity value of at least 1000 NTU are considered sufficiently opacified. The results of the turbidity test are summarized in Table 6 below.

TABLE 6

| Sample | Final Turbidity (NTU) |
|---|---|
| Reference 1 | 4 |
| Sample 1 | 2584 |
| Sample 2 | 2236 |
| Sample 3 | 2132 |
| Sample 4 | 1404 |
| Sample 5 | 1110 |
| Sample 6 | 1402 |
| Sample 7 | 1380 |

The results summarized in Table 6 show that each of the Samples 1-7 (again including at least 75 mole percent of sodium hydroxide from 4 to 10% by weight of the coconut fatty acid) had final turbidity values of greater than 1000 NTU, rendering Samples 1-7 having sufficient opacification for a liquid detergent composition. In contrast, Reference 1 had a final turbidity value of 4 NTU, which was below the bench line of 10 NTU thereby rendering Reference 1 as being transparent and therefore having insufficient opacification for a liquid detergent composition.

Example 4

Each of the Samples 1-10 were prepared by two different processes. In a first process, the neutralizing agents (monoethanolamine and sodium hydroxide) were added to a vessel followed by the LAS surfactant and then the coconut fatty acid was added. Each of the Samples 1-7 produced by this first process was a stable opacified product.

In a second process, the neutralizing agents were added to a vessel followed by the coconut fatty acid and then the LAS surfactant. Each of the Samples 1-7 produced by this second process was an unstable opacified product. In particular, precipitates formed during the process fell to the bottom of the vessel.

As used herein, the article "a," "an," and "the" can be used herein to refer to one or more than one (i.e., to at least one) of the grammatical object of the article unless the language and/or context clearly indicates otherwise.

As used herein, the term "about" is understood by persons of ordinary skill in the art and varies to some extent depending upon the context in which the term is used. If there are uses of the term which are not clear to persons of ordinary skill in the art, given the context in which the term is used, "about" means up to plus or minus 10% of the particular term.

It is to be understood that one or more values described above may vary by +/−5%, +/−10%, +/−15%, +/−20%, etc. so long as the variance remains within the scope of the present disclosure. It is also to be understood that the appended claims are not limited to express particular compounds, compositions, or methods described in the detailed description, which may vary between particular embodiments which fall within the scope of the appended claims.

It is also to be understood that any ranges or subranges relied upon in describing the various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. Additionally, an individual number within a disclosed range may be relied upon and provides adequate support for specific embodiments within the scope of the appended claims. For example, a range "of from about 100 to about 200" includes various individual integers such as 101, 102, 103, etc., as well as individual numbers including a decimal point (or fraction) such as 100.1, 100.2, etc., which may be relied upon and provide adequate support for specific embodiments within the scope of the appended claims.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A unit dose detergent pack comprising:

a pouch formed from a water-soluble film; and an opacified liquid detergent composition releasably disposed within said pouch and comprising:

a plurality of neutralizing agents including more than 50 mole percent of sodium hydroxide and a remainder of alkanolamine present based on a total of 100 mole percent of said plurality of neutralizing agents;

a fatty acid; and at least one surfactant;

a bittering agent; and less than 30% by weight of water, wherein a weight ratio of said sodium hydroxide to said fatty acid is from about 0.3:1 to about 0.8:1, and wherein said opacified liquid detergent composition is free of a microplastic opacifier and has a turbidity of at least 250 turbidity units (NTU) measured utilizing a turbidity meter at about 24° C.

2. The unit dose detergent pack as set forth in claim 1 wherein said opacified liquid detergent composition includes from about 75 to about 90 mole percent of said sodium hydroxide based on a total of 100 mole percent total of said plurality of neutralizing agents.

3. The unit dose detergent pack as set forth in claim 1 wherein said alkanolamine is monoethanolamine (MEA).

4. The unit dose detergent pack as set forth in claim 1 wherein said opacified liquid detergent composition includes from about 4 to about 10% by weight of said fatty acid based on a total weight of said opacified liquid detergent composition.

5. The unit dose detergent pack as set forth in claim 1 wherein said fatty acid is obtained from palm kernel oil and has a backbone including from 12 to 20 carbon atoms.

6. The unit dose detergent pack as set forth in claim 1 wherein said fatty acid is a coconut fatty acid.

7. The unit dose detergent pack as set forth in claim 1 wherein said opacified liquid detergent composition includes from about 10% to about 20% by weight of said water based on a total weight of said opacified liquid detergent composition.

8. The unit dose detergent pack as set forth in claim 1 wherein said opacified liquid detergent composition includes from about 20 to about 50% by weight of at least one surfactant based on a total weight of said opacified liquid detergent composition.

9. The unit dose detergent pack as set forth in claim 8 wherein said at least one surfactant is linear alkylbenzene sulfonate (LAS).

10. The unit dose detergent pack as set forth in claim 1 wherein said opacified liquid detergent composition has a turbidity of at least 1000 turbidity units (NTU) measured utilizing a turbidity meter at 24° C.

11. The unit dose detergent pack as set forth in claim 1 wherein said opacified liquid detergent composition has a pH of from about 6 to about 8.

12. An opacified liquid detergent composition comprising:

2.0% to 5.0% by weight of sodium hydroxide;

0.3% to 5% by weight of an alkanolamine;

20.0% to 50.0% of a surfactant;

4.0% to 10.0% by weight of a fatty acid;

greater than 0% to 0.05% of a bittering agent;

less than 30% by weight of water;

wherein said opacified liquid detergent composition includes from about 75 to about 90 mole percent of said sodium hydroxide based on a total of 100 mole percent total of said plurality of neutralizing agents;

wherein said opacified liquid detergent composition is free of a microplastic opacifier and has a turbidity of at least 250 turbidity units (NTU) measured utilizing a turbidity meter at about 24° C.

13. The opacified liquid detergent composition as set forth in claim 12 wherein said opacified liquid detergent composition has a turbidity of at least 1000 turbidity units (NTU) measured utilizing a turbidity meter at about 24° C.

14. The opacified liquid detergent composition as set forth in claim 12 wherein a weight ratio of said sodium hydroxide to said fatty acid is from about 0.3:1 to about 0.8:1.

15. The opacified liquid detergent composition as set forth in claim 12 wherein said opacified liquid detergent composition includes from about 10% to about 20% by weight of said water based on a total weight of said opacified liquid detergent composition.

16. The unit dose detergent pack as set forth in claim 1 wherein said surfactant comprises one or more of an anionic surfactant and a nonionic surfactant.

17. A method of making an opacified liquid detergent composition for a unit dose detergent pack, said method comprising the steps of:

combining an alkanolamine and sodium hydroxide to form a combination with the sodium hydroxide present in an amount of more than 50 mole percent based on a total of 100 mole percent of the sodium hydroxide and the alkanolamine together;

adding a surfactant, a bittering agent, and water to the combination to form a mixture; and then adding a fatty acid to the mixture to form the opacified liquid detergent composition that is free of a microplastic opacifier and has a turbidity of at least 250 turbidity units (NTU) measured utilizing a turbidity meter at 24° C.;

wherein a weight ratio of said sodium hydroxide to said fatty acid is from about 0.3:1 to about 0.8:1; and encapsulating the opacified liquid detergent composition into a pouch formed from a water-soluble film.

18. The method as set forth in claim 17 wherein the surfactant is a linear alkylbenzene sulfonate and the step of adding the surfactant is further defined as adding from about 20 to about 50% by weight of the linear alkylbenzene sulfonate to the combination to form the mixture.

19. The method as set forth in claim 17 wherein the fatty acid is a coconut fatty acid and the step of adding the fatty acid is further defined as adding from about 4 to about 10% by weight of the coconut fatty acid to the mixture to form the opacified liquid detergent composition.

* * * * *